(12) United States Patent
Avanzi et al.

(10) Patent No.: US 10,142,303 B2
(45) Date of Patent: Nov. 27, 2018

(54) SEPARATION OF SOFTWARE MODULES BY CONTROLLED ENCRYPTION KEY MANAGEMENT

(71) Applicant: QUALCOMM Incorporated, San Diego, CA (US)

(72) Inventors: Roberto Avanzi, Munich (DE); David Hartley, Seaview Downs (AU); Rosario Cammarota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 15/053,892

(22) Filed: Feb. 25, 2016

(65) Prior Publication Data

US 2017/0085542 A1 Mar. 23, 2017

Related U.S. Application Data

(60) Provisional application No. 62/189,733, filed on Jul. 7, 2015.

(51) Int. Cl.
*H04L 29/06* (2006.01)
*G06F 12/14* (2006.01)
(Continued)

(52) U.S. Cl.
CPC ........ *H04L 63/061* (2013.01); *G06F 11/0727* (2013.01); *G06F 11/167* (2013.01);
(Continued)

(58) Field of Classification Search
CPC ............. G06F 21/00; G06F 21/78; H04L 9/00
(Continued)

(56) References Cited

U.S. PATENT DOCUMENTS 8,473,754 B2 6/2013 Jones et al.
8,516,271 B2 8/2013 Faraboschi et al.
(Continued)

OTHER PUBLICATIONS

International Search Report and Written Opinion—PCT/US2016/039403—ISA/EPO—dated Sep. 14, 2016.

*Primary Examiner* — Lynn D Feild
*Assistant Examiner* — Viral S Lakhia
(74) *Attorney, Agent, or Firm* — Jae-Hee Choi; Loza & Loza

(57) ABSTRACT

In an aspect, a method for protecting software includes obtaining a payload including at least one of instructions or data, establishing a realm in a memory device, encrypting the payload based on an ephemeral encryption key (EEK) associated with the realm, and storing the encrypted payload in the realm of the memory device. In another aspect, a method for protecting software includes receiving a memory transaction associated with the memory device, the memory transaction including at least a realm identifier (RID) and a realm indicator bit, obtaining the EEK associated with the RID when the RID indicates the realm and when the realm indicator bit is enabled, decrypting an instruction and/or data retrieved from the realm based on the EEK when the memory transaction is a read transaction, and encrypting second data for storage in the realm based on the EEK when the memory transaction is a write transaction.

16 Claims, 12 Drawing Sheets

(51) Int. Cl.
  *G06F 21/62*   (2013.01)
  *G06F 21/78*   (2013.01)
  *G06F 11/07*   (2006.01)
  *G06F 11/16*   (2006.01)
  *G06F 11/30*   (2006.01)

(52) U.S. Cl.
  CPC ...... *G06F 11/3037* (2013.01); *G06F 12/1408* (2013.01); *G06F 21/6218* (2013.01); *G06F 21/78* (2013.01); *G06F 2212/1052* (2013.01)

(58) Field of Classification Search
  USPC .................................. 713/190–193; 726/2–5
  See application file for complete search history.

(56) References Cited

U.S. PATENT DOCUMENTS

| | | | | |
|---|---|---|---|---|
| 8,650,393 B2* | 2/2014 | Kato | ................... | H04L 9/0816 713/155 |
| 8,667,286 B2* | 3/2014 | Kato | ................... | H04L 9/0816 380/277 |
| 8,675,868 B1* | 3/2014 | Yearsley | ............. | G06F 12/1408 380/29 |
| 8,726,042 B2 | 5/2014 | Lange et al. | | |
| 8,839,001 B2* | 9/2014 | King | ...................... | G06F 21/79 713/190 |
| 9,935,774 B2* | 4/2018 | Sharma | .................. | H04L 9/3242 |
| 2005/0091501 A1* | 4/2005 | Osthoff | ................... | G06F 21/51 713/181 |
| 2008/0155273 A1 | 6/2008 | Conti | | |
| 2011/0022853 A1* | 1/2011 | Donie | .................... | G06F 21/78 713/190 |
| 2014/0053001 A1 | 2/2014 | Rodgers et al. | | |
| 2014/0101459 A1* | 4/2014 | Debout | ................. | G06F 21/606 713/190 |
| 2014/0192766 A1* | 7/2014 | Akisada | ................ | H04W 12/02 370/329 |
| 2015/0169472 A1* | 6/2015 | Yap | ..................... | G06F 12/1408 713/190 |
| 2015/0249468 A1* | 9/2015 | Nikkila | ................. | G10L 19/005 714/746 |
| 2015/0280913 A1* | 10/2015 | Smart | .................. | G06F 12/1408 713/193 |
| 2015/0371063 A1* | 12/2015 | Van Antwerpen | ...... | G06F 21/80 713/190 |
| 2016/0055101 A1* | 2/2016 | Gerhart | ................... | G09C 1/00 713/193 |
| 2016/0062920 A1* | 3/2016 | Hars | ........................ | G09C 1/00 713/193 |
| 2016/0344552 A1* | 11/2016 | Sharma | ................ | H04L 9/3242 |

* cited by examiner

_US 10,142,303 B2_

SEPARATION OF SOFTWARE MODULES BY CONTROLLED ENCRYPTION KEY MANAGEMENT

CLAIM OF PRIORITY UNDER 35 U.S.C. § 119

The present Application for Patent claims priority to U.S. Provisional Application No. 62/189,733 entitled "SEPARATION OF SOFTWARE MODULES BY CONTROLLED ENCRYPTION KEY MANAGEMENT" filed Jul. 7, 2015, and assigned to the assignee hereof and hereby expressly incorporated by reference herein.

BACKGROUND

Field of the Disclosure

Aspects of the present disclosure relate generally to secure memory management, and more specifically, but not exclusively, to separation of software modules by controlled encryption key management.

Description of Related Art

Software developers typically generate code (e.g., drivers, applications, games) and allow customers and other authorized users to install and use the code in various products. For example, the code may be installed and stored in a memory device of an electronic device, such as a mobile phone or laptop computer. However, such code may be accessed and reverse engineered by unauthorized users (e.g., hackers), resulting in a loss of valuable intellectual property. Therefore, there is a need to protect the code in electronic products in order to prevent access of the code by unauthorized users.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

According to one aspect, a method operational on a software protection device is provided to protect software (e.g., target software). For example, the target software to be protected may include instructions and/or data that may be processed by a core device. The software protection device obtains a payload including at least one of instructions or data, establishes a realm in a memory device, the realm including one or more selected regions in the memory device, encrypts the payload based on an ephemeral encryption key associated with the realm, and stores the encrypted payload in the realm of the memory device. The term "realm" as used herein may be defined as one or more selected, pre-defined, or dynamically-defined memory regions(s), domains, segment(s), and/or block(s) of a memory device. In an aspect, the software protection device may establish the realm by generating a realm identifier and the ephemeral encryption key for the realm, where the realm identifier is associated with the ephemeral encryption key. In an aspect, the software protection device stores the realm identifier and the ephemeral encryption key in a second memory device that is not accessible to any external entities. In an aspect, the ephemeral encryption key is a temporary or transitory encryption key that exists while the realm is maintained in the memory device. For example, the software protection device may obtain the payload in a secure communication or from a secure storage. In an aspect, the software protection device removes a cryptographic protection applied to the payload prior to the encrypting the payload based on the ephemeral encryption key. For example, the software protection device may remove the cryptographic protection by verifying the payload or decrypting the payload using a permanent cryptographic key. In an aspect, the software protection device further obtains a second payload including at least one of second instructions or second data, establishes a second realm in the memory device, the second realm including one or more selected regions in the memory device different from the one or more selected regions included in the established realm, encrypts the second payload based on a second ephemeral encryption key associated with the second realm, and stores the second encrypted payload in the second realm of the memory device. In an aspect, the software protection device establishes the realm by generating a second realm identifier and the second ephemeral encryption key for the second realm in the memory device, where the second realm identifier is associated with the second ephemeral encryption key. In an aspect, the software protection device stores the second realm identifier and the second ephemeral encryption key in a second memory device that is not accessible to any external entities.

According to one aspect, a software protection device includes means for obtaining a payload including at least one of instructions or data, means for establishing a realm in a memory device, the realm including one or more selected regions in the memory device, means for encrypting the payload based on an ephemeral encryption key associated with the realm, and means for storing the encrypted payload in the realm of the memory device. In an aspect, the means for establishing the realm is configured to generate a realm identifier and the ephemeral encryption key for the realm, where the realm identifier is associated with the ephemeral encryption key. In an aspect, the software protection device further includes means for storing the realm identifier and the ephemeral encryption key in a second memory device that is not accessible to any external entities. In an aspect, the software protection device further includes means for removing a cryptographic protection applied to the payload prior to the encrypting the payload based on the ephemeral encryption key. In an aspect, the means for removing the cryptographic protection is configured to verify the payload or decrypt the payload using a permanent cryptographic key. In an aspect, the software protection device further includes means for obtaining a second payload including at least one of second instructions or second data, means for establishing a second realm in the memory device, the second realm including one or more selected regions in the memory device different from the one or more selected regions included in the established realm, means for encrypting the second payload based on a second ephemeral encryption key associated with the second realm, and means for storing the second encrypted payload in the second realm of the memory device. In an aspect, the means for establishing the second realm is configured to generate a second realm identifier and the second ephemeral encryption key for the second realm in the memory device, where the second realm identifier is associated with the second ephemeral encryption key. In an aspect, the software protection device further includes means for storing the second realm identifier and the second ephemeral encryption key in a second memory device that is not accessible to any external entities.

According to another aspect, a method operational on a software protection device is provided to protect software (e.g., target software). The software protection device receives a memory transaction associated with the memory device, the memory transaction including at least a realm identifier and a realm indicator bit, where the realm identifier enables identification of a realm that includes one or more selected regions in the memory device, obtains an ephemeral encryption key associated with the realm identifier when the realm identifier indicates the realm and when the realm indicator bit is enabled, decrypts at least one of an instruction or data received from the realm based on the ephemeral encryption key when the memory transaction is a read transaction, and encrypts second data to be stored in the realm based on the ephemeral encryption key when the memory transaction is a write transaction. In an aspect, the software protection device stores the realm identifier and the ephemeral encryption key in a second memory device that is not accessible to any external entities. In an aspect, the software protection device refrains from modifying the memory transaction when the realm identifier is zero or a special value. For example, the ephemeral encryption key may be a temporary or transitory encryption key that exists while the realm is maintained in the memory device. In an aspect, the memory transaction further includes a control bit that controls access to regions of the memory device outside of the realm. In such aspect, the software protection device may refrain from modifying the memory transaction when the realm identifier is not zero or a special value, the realm indicator bit is disabled, the control bit is enabled, and when the transaction is a data read transaction or a data write transaction. In an aspect, the software protection device detects a fault in the memory transaction when the realm identifier is not zero or a special value, the realm indicator bit is disabled, the control bit is enabled, and when the transaction is an instruction fetch transaction. In an aspect, the software protection device detects a fault in the memory transaction when the realm identifier is not zero or a special value, and when the realm indicator bit and the control bit are disabled.

According to another aspect, a software protection device includes means for receiving a memory transaction associated with the memory device, the memory transaction including at least a realm identifier and a realm indicator bit, where the realm identifier enables identification of a realm that includes one or more selected regions in the memory device, means for obtaining an ephemeral encryption key associated with the realm identifier when the realm identifier indicates the realm and when the realm indicator bit is enabled, means for decrypting at least one of an instruction or data received from the realm based on the ephemeral encryption key when the memory transaction is a read transaction, and means for encrypting second data to be stored in the realm based on the ephemeral encryption key when the memory transaction is a write transaction. In an aspect, the software protection device further includes means for storing the realm identifier and the ephemeral encryption key in a second memory device that is not accessible to any external entities. In an aspect, the software protection device further includes means for refraining from modifying the memory transaction when the realm identifier is zero or a special value. In an aspect, the memory transaction further includes a control bit that controls access to regions of the memory device outside of the realm. In such aspect, the software protection device further includes means for refraining from modifying the memory transaction when the realm identifier is not zero or a special value, the realm indicator bit is disabled, the control bit is enabled, and when the transaction is a data read transaction or a data write transaction. In an aspect, the software protection device further includes means for detecting a fault in the memory transaction when the realm identifier is not zero or a special value, the realm indicator bit is disabled, the control bit is enabled, and when the transaction is an instruction fetch transaction. In an aspect, the software protection device further includes means for detecting a fault in the memory transaction when the realm identifier is not zero or a special value, and when the realm indicator bit and the control bit are disabled.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Overview

One aspect of the present disclosure refers to apparatuses, methods, and computer-readable mediums including instructions for obtaining a payload including at least one of instructions or data, establishing a realm in a memory device, the realm including one or more selected regions in the memory device, encrypting the payload based on an ephemeral encryption key (EEK) associated with the realm, and storing the encrypted payload in the realm of the memory device.

Another aspect of the present disclosure refers to apparatuses, methods, and computer-readable mediums including instructions for receiving a memory transaction associated with the memory device, the memory transaction including at least a realm identifier (RID) and a realm indicator bit (RB), where the RID enables identification of a realm that includes one or more selected regions in the memory device, obtaining an ephemeral encryption key (EEK) associated with the RID when the RID indicates the realm and when the realm indicator bit is enabled, decrypting at least one of a first instruction or first data retrieved from the realm based on the EEK when the memory transaction is a read transaction, and encrypting second data to be stored in the realm based on the EEK when the memory transaction is a write transaction.

In the aspects disclosed herein, a software protection device may be configured to protect software (also referred to as target software) that is to be accessed and/or executed by a core device (also referred to as a core circuit or a core processing circuit). For example, the core device may serve as a processor in a central processing unit (CPU). The software protection device may protect the target software by establishing a realm in a memory device that serves as a main memory for the core device and by storing the target software in a protected form in the realm. The term "realm" as used herein may be defined as one or more selected, pre-defined, or dynamically-defined memory regions(s), domains, segment(s), and/or block(s) of a memory device. For example, memory regions in the memory device included in a realm may be indicated or referenced as a set of memory pages associated with the memory device. In one example, the memory device may be a volatile memory device (e.g., a random-access memory (RAM) device).

Figure 1:
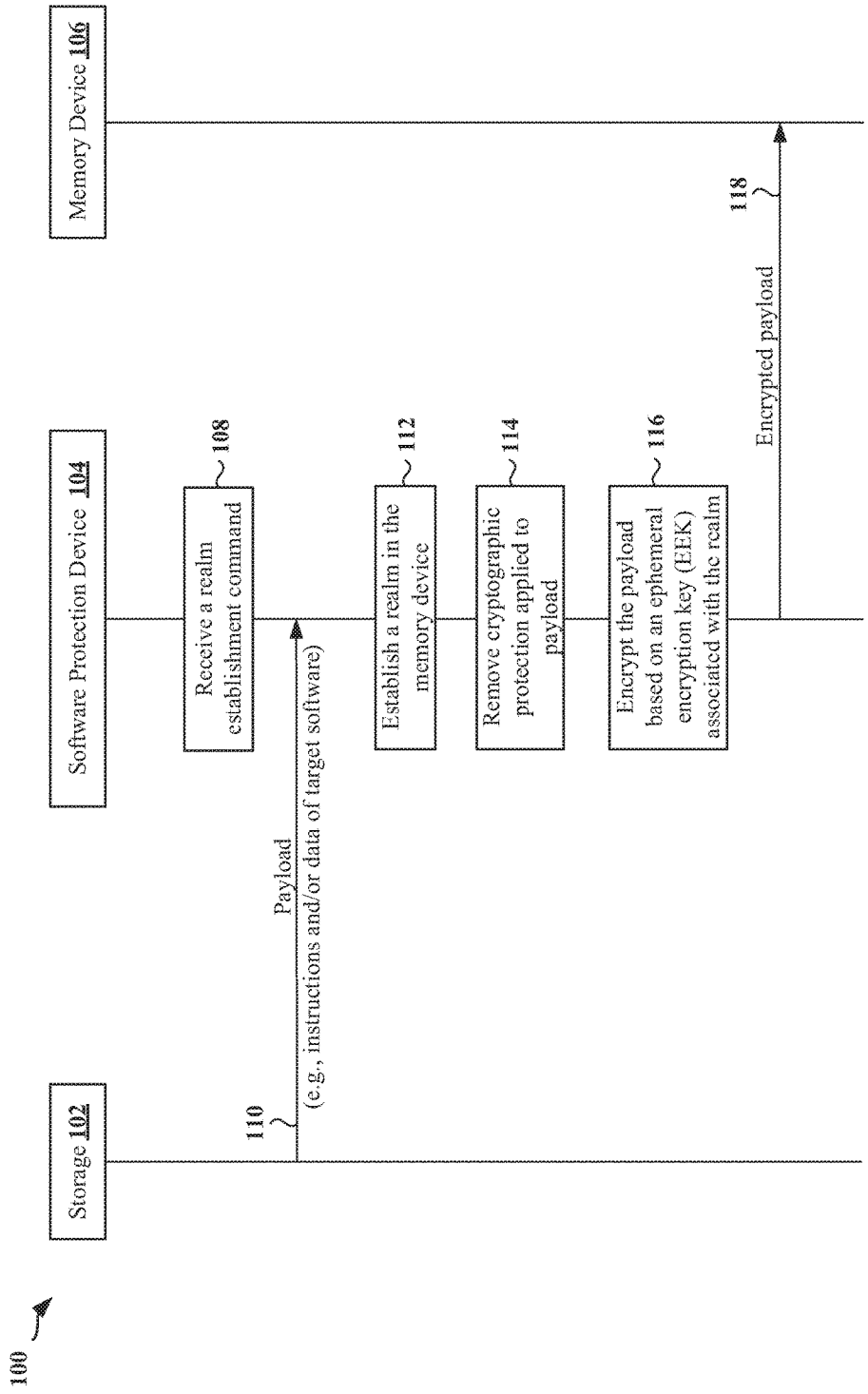
FIG. 1 is an example flow diagram illustrating realm establishment in a memory device in accordance with various aspects of the present disclosure.

FIG. 1 is an example flow diagram 100 illustrating realm establishment in a memory device in accordance with various aspects of the present disclosure. As shown in FIG. 1, the example flow diagram 100 includes a storage 102, a software protection device 104, and a memory device 106. As described in detail below, a software protection device (e.g., a software protection device 104) may be implemented as a hardware architecture. As shown in FIG. 1, the software protection device 104 may receive 108 a realm establishment command. In response to the realm establishment command, the software protection device 104 may obtain a payload 110 including target software (e.g., instructions and/or data of target software) from the storage 102. The software protection device 104 may proceed to establish 112 a realm in the memory device 106. For example, the software protection device 104 may establish the realm in the memory device 106 by generating a realm identifier (RID) and a unique ephemeral encryption key (EEK) for the realm. For example, the ephemeral encryption key may be a temporary or transitory encryption key that exists while the realm is maintained in the memory device 106. In a case where cryptographic protection has been applied to the payload (e.g., the target software in the storage 102 is encrypted), the software protection device 104 may proceed to remove 114 such cryptographic protection. In one example, the software protection device 104 may remove the cryptographic protection by decrypting the payload based on a permanent cryptographic key. The software protection device 104 may encrypt the payload based on the EEK associated with the realm and may store the encrypted payload 118 in the memory device 106.

Figure 2:
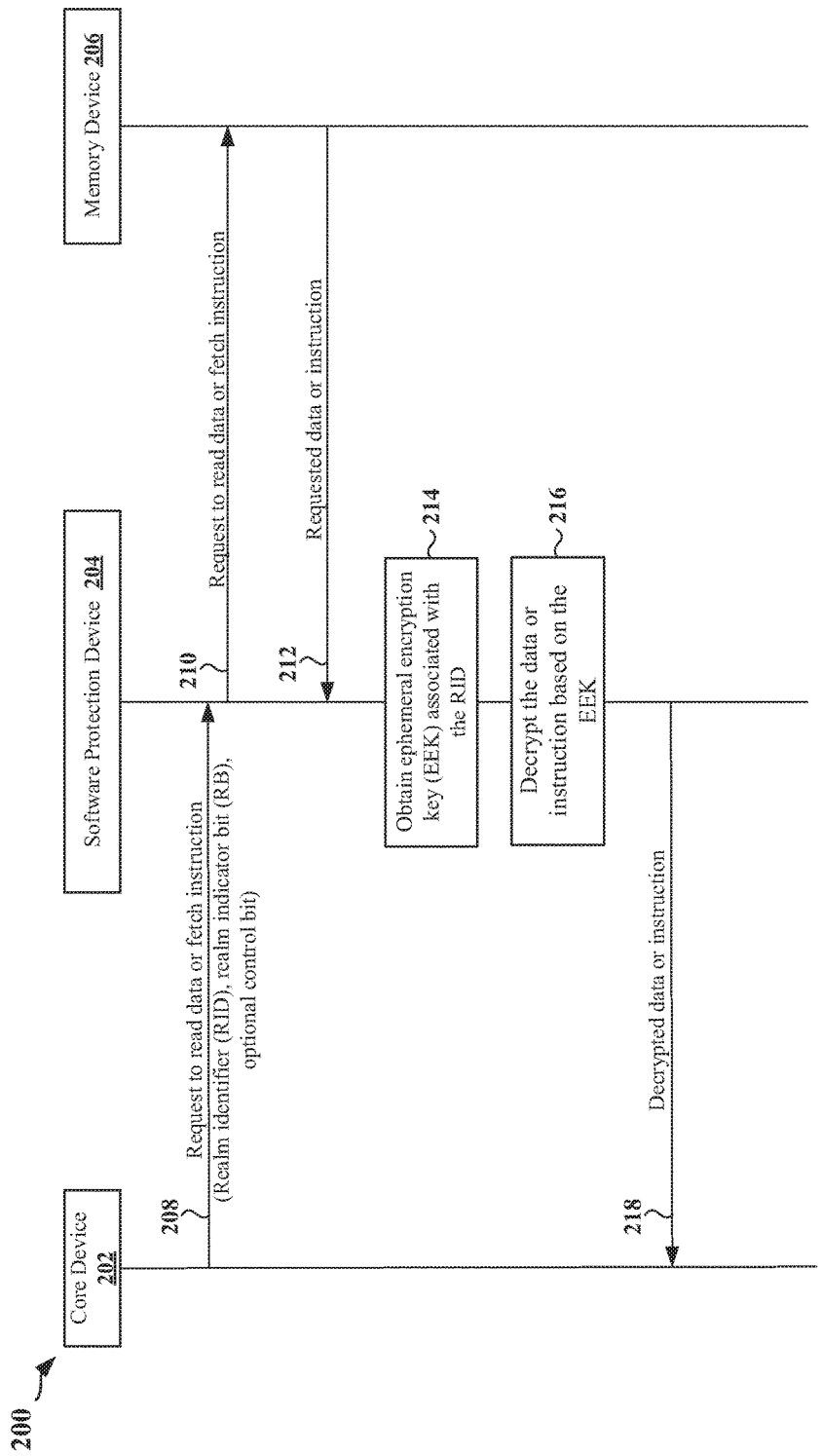
FIG. 2 is an example flow diagram illustrating execution of a realm in a memory device in accordance with various aspects of the present disclosure.

FIG. 2 is an example flow diagram 200 illustrating execution of a previously established realm in a memory device in accordance with various aspects of the present disclosure. As shown in FIG. 2, the example flow diagram 200 includes a core device 202, a software protection device 204, and a memory device 206. As shown in FIG. 2, the core device 202 may initiate a memory transaction 208 requesting data and/or instructions from the memory device 206. In one example, the memory transaction 208 may include a realm identifier (RID), a realm indicator bit (RB), and an optional control bit. The software protection device 204 may receive the memory transaction 208 and may forward the memory transaction (e.g., memory transaction 210) to the memory device 206. The software protection device 204 may receive the requested data or instruction 212 from the memory device 206 and may obtain an ephemeral encryption key (EEK) associated with the RID when the RID indicates the realm (e.g., when the RID is a non-zero value or is not a special value) and when the realm indicator bit is enabled. The software protection device 204 may decrypt the received data based on the EEK when the memory transaction is a read transaction or may decrypt the received instruction based on the EEK when the memory transaction is an instruction fetch transaction.

Figure 3:
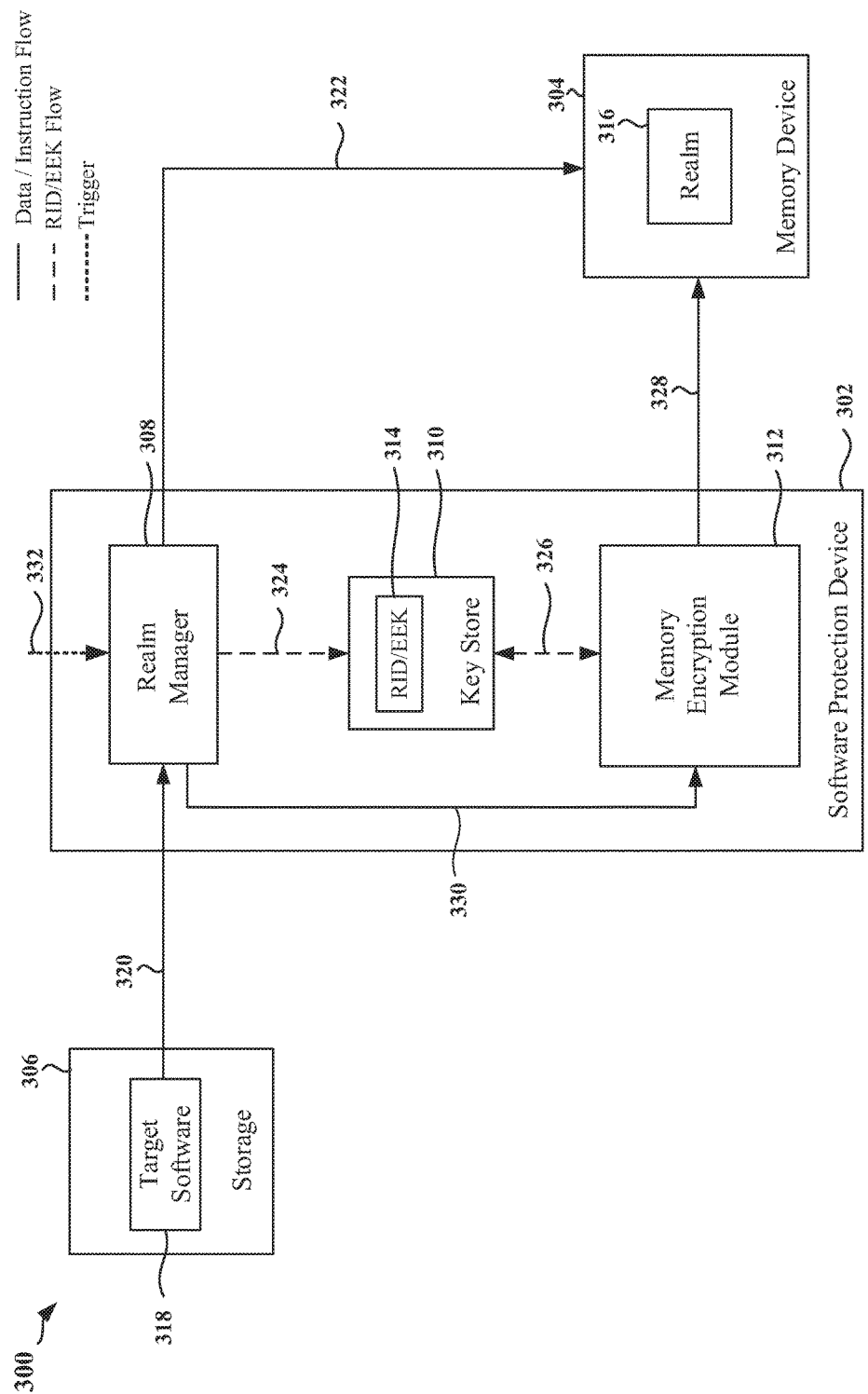
FIG. 3 is a block diagram of an example architecture in accordance with various aspects of the present disclosure.

FIG. 3 is a block diagram of an example architecture 300 in accordance with various aspects of the present disclosure. For example, the architecture 300 may be implemented in a computing device, such as a personal computer, cell phone (also referred to as a user equipment (UE)), or a handheld gaming device. As shown in FIG. 3, the architecture 300 includes a software protection device 302, a memory device 304, and a storage 306. As further shown in FIG. 3, the software protection device 302 may include a realm manager 308, a key store 310, and a memory encryption module 312. In an aspect of the present disclosure, the realm manager 308 may be implemented as an application in a secure processor, as a separate core device, or as a hardware block. For example, the realm manager 308 may use a crypto coprocessor to offload heavy tasks. In an aspect of the present disclosure, the memory device 304 may serve as a main memory that is configured to load and store instructions for execution by a central processing unit (CPU) (not shown in FIG. 3 for ease of illustration). For example, the memory device 304 may be a volatile memory device, such as a random access memory (RAM), a cache memory device, or any other suitable type of memory device.

In one aspect of the present disclosure, the storage 306 may be configured to store valuable or sensitive software, such as the target software 318. In one aspect of the present disclosure, the target software 318 may be proprietary software that includes instructions and/or data. For example, the instructions and/or data may include a stack, a heap, and/or metadata. In one aspect, the target software 318 may be a software module. In an aspect of the present disclosure, the storage 306 may be any suitable storage device. In one example, the storage 306 may be local memory (e.g., a memory of another CPU). In another example, the storage 306 may be a local non-volatile storage device, such as a flash memory, an embedded MultiMediaCard (eMMC), Secure Digital (SD) card, a USB drive, optical disc, or magnetic disk. In another example, the storage 306 may be a remote storage accessible through a network.

In an aspect of the present disclosure, the software protection device 302 is a hardware architecture configured to protect software, such as the target software 318 (e.g., the instructions and/or data associated with the target software 318). For example, the software protection device 302 may protect the target software 318 from a variety of attackers (e.g., hackers) that may gain control of various hardware and/or software in a device. In an aspect of the present disclosure, various features of the software protection device 302 may be incorporated into a software development kit (SDK) to allow third party developers to protect their software. The software protection device 302 may be implemented without a substantial impact on tools and host environment.

In an aspect of the present disclosure, configuration of a software protection device (e.g., software protection device 302) as disclosed herein may be outside the control of original equipment manufacturers (OEMs). In such aspect, the software protection device may not restrict the ability of an OEM or other parties (e.g., third party software developers) to install any software in the memory device 304. The software protection device may not require specific execution by an OEM or third parties. In an aspect, a software protection device (e.g., software protection device 302) may be scalable (any number of core devices) and may be used with various types of core devices. In an aspect, the architecture 300 (or the architecture 400 discussed below with reference to FIG. 4) may protect the target software 318 (e.g., the instructions and/or data of the target software 318) based on memory encryption of the target software 318 and not based on access control of a memory (e.g., memory device 304).

Establishment of a Realm in a Memory Device

As shown in FIG. 3, the realm manager 308 of the software protection device 302 may generate one or more realms (e.g., the realm 316) in the memory device 304. In one example, the realm manager 308 may generate the realm 316 in the memory device 304 in response to a trigger, such as a realm establishment command 332. In one example, the realm establishment command 332 may be implemented as a remote procedure call (RPC) from a CPU (not shown in FIG. 3 for ease of illustration). In another example, the realm establishment command 332 may be a command of a startup sequence for the realm manager 308. The realm establishment command 332 may include various items of information. In one aspect of the present disclosure, the realm establishment command 332 may include the location (e.g., memory address) of the target software 318 in the storage 306, the location (e.g., memory address) of the realm 316 in the memory device 304, and/or the location of one or more keys that may be used to verify and/or remove any cryptographic protection applied to the instructions and/or data of the target software 318.

In response to receiving the realm establishment command 332, the realm manager 308 may generate a realm identifier (RID) for the realm 316 and an ephemeral encryption key (EEK) for the realm 316. In one aspect of the present disclosure, the RID and the EEK may be unique to realm 316 and may not be associated with any other realms that may be established in the memory device 304. In one aspect of the present disclosure, the realm manager 308 may store the RID and the corresponding EEK (e.g., shown in FIG. 3 as the RID/EEK pair 314) in the key store 310 through the exclusive interface 324. In an aspect of the present disclosure, the RID may be disclosed to entities outside of the software protection device 302, while the EEK may not be known to any entity outside of the software protection device 302. In an aspect of the present disclosure, the RID, the EEK, and their association may be modified within the software protection device 302 and may not be modified by any entity external to the software protection device 302.

As shown in FIG. 3, the realm manager 308 may obtain all or at least some of the instructions and/or data of the target software 318 through the transmission 320 from the storage 306. In an aspect of the present disclosure, the realm manager 308 may obtain all or at least some of the instructions and/or data of the target software 318 by reading the location (e.g., memory address) of the target software 318 in the storage 306, in which case the transmission 320 may be received by the realm manager 308 in response to a read operation. In an aspect of the present disclosure, the target software 318 stored in the storage 306 may be protected. In one example, the target software 318 may be in plain text form and physically protected, in which case the storage 306 may be configured as a secure storage (e.g., on-chip storage, in-package storage, etc.). In another example, the target software 318 may be cryptographically protected (e.g., encrypted and/or authenticated). In such example, the realm manager 308 may obtain a file that includes the target software 318 from the secure storage 306 and may access one or more keys (e.g., one or more permanent keys) used to apply the cryptographic protection to the target software 318. The realm manager 308 may proceed to verify and/or remove (e.g., decrypt) the cryptographic protection using the one or more keys. After the cryptographic protection is removed, the realm manager 308 may then encrypt the instructions and/or data of the target software 318 using the EEK of the RID/EEK pair 314 and may store the encrypted instructions and/or data of the target software 318 in the realm 316 of the memory device 304.

In one example, the realm manager 308 may achieve the encryption of the instructions and/or data of the target software 318 by implementing an encryption function within the realm manager 308, and implementing a direct interface 322 between the realm manager 308 and the memory device 304. In another example, the realm manager 308 may achieve the encryption of the instructions and/or data of the target software 318 by implementing the memory encryption module 312 of the software protection device 302 via the interface 330. In such example, the realm manager 308 may provide the RID associated with the realm 316 to the memory encryption module 312. The memory encryption module 312 may retrieve the EEK associated with the RID from the key store 310 via exclusive interface 326. The memory encryption module 312 may proceed to encrypt the instructions and/or data of the target software 318 and may transmit the encrypted instructions and/or data 328 for storage in the realm 316 of the memory device 304. It should be understood that the encrypted form of the target software 318 (e.g., the encrypted form of the instructions and/or data of the target software 318) in the realm 316 prevents a core device (not shown in FIG. 3) from being able to execute the target software 318.

In an aspect of the present disclosure, the encryption scheme used to encrypt the target software 318 based on the EEK may be physical address dependent. In such aspect, if the realm 316 is later relocated in the memory device 304 from a first physical address to a second physical address, the realm manager 308 may initiate decryption of the contents of the realm 316 using the EEK of the RID/EEK pair 314 and the first physical address. The realm manager 308 may then initiate re-encryption of the contents of the realm 316 using the EEK of the RID/EEK pair 314 and the second physical address. In an aspect of the present disclosure, the EEK of the RID/EEK pair 314 may be valid (e.g., exists) during the period when instructions in a memory page of a realm (e.g., realm 316) protected with the EEK are being executed by a core device (e.g., core device 444 discussed below), and the EEK may no longer be valid (e.g., deleted) after the instructions in the memory page of the realm have been executed.

Execution of a Realm in a Memory Device

Figure 4:
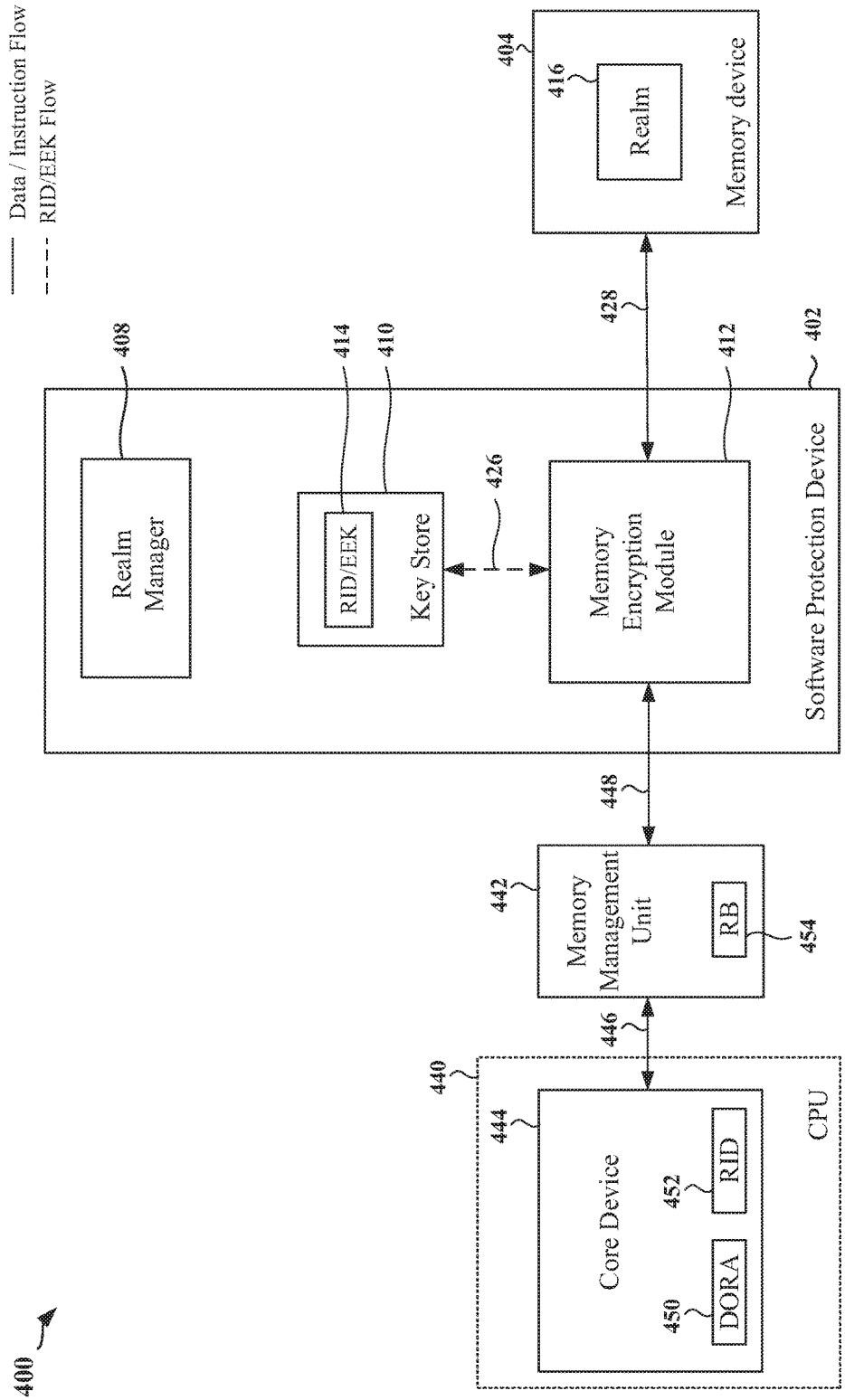
FIG. 4 is a block diagram of an example architecture in accordance with various aspects of the present disclosure.

FIG. 4 is a block diagram of an example architecture 400 in accordance with various aspects of the present disclosure. For example, the architecture 400 may be implemented in a computing device, such as a personal computer, cell phone (also referred to as a UE), or a handheld gaming device. As shown in FIG. 4, the architecture 400 includes, a software protection device 402, a memory device 404, a central processing unit (CPU) 440, and a memory management unit (MMU) 442. As further shown in FIG. 4, the CPU 440 may include a core device 444, and the software protection device 402 may include a realm manager 408, a key store 410, and a memory encryption module 412. In other aspects, the MMU 442 may be included in the CPU 440. In an aspect of the present disclosure, the software protection device 402, the memory device 404, the realm manager 408, the key store 410, and the memory encryption module 412 in FIG. 4 may respectively correspond to the software protection device 302, the memory device 304, the realm manager 308, the key store 310, and the memory encryption module 312 in FIG. 3.

Core Device Operations for Realm Execution

In one aspect of the present disclosure, the core device 444 may initiate a memory transaction with respect to the memory device 404 by transmitting a memory command to the MMU 442 via the path 446. Therefore, in one example, the memory command may be configured to execute a data read transaction for reading data from the memory device 404 or may be configured to execute a data write transaction for writing data to the memory device 404. In another example, the memory command may be configured to execute an instruction fetch transaction (also referred to as an instruction read transaction) for fetching an instruction from the memory device 404.

In one aspect of the present disclosure, after the realm 416 has been established and the encrypted instructions and/or data of the target software 318 have been stored in the realm 416 in a manner previously described, the core device 444 may enter the realm 416 to read data from the realm 416, write data to the realm 416, or fetch an instruction from the realm 416. Accordingly, in such aspect, the core device 444 may support an instruction for entering the realm 416 by referencing the RID corresponding to the realm 416. The core device 444 may further support an instruction for exiting the realm 416. In an aspect of the present disclosure, the core device 444 may include an RID register 452 that is configured to store an RID. The RID register 452 may not be visible to any software. In one example, the RID register 452 may indicate that no realm is being referenced or identified when a zero value or other special value is stored in the RID register 452. For example, an instruction for entering the realm 416 may set the RID value corresponding to the realm 416 in the RID register 452 and may allow a jump to the beginning of the realm 416. In one aspect of the present disclosure, an instruction for exiting a realm may restore a previous state (e.g., prior to entering the realm 416) in the memory device 404. In such example, the core device 444 may clear the RID value corresponding to the realm 416 in the RID register 452.

In one aspect of the present disclosure, each memory transaction between the core device 444 and the memory device 404 may be tagged to include the RID currently stored in the RID register 452, the type of memory transaction (e.g., data or instruction), and an optional control bit 450. In an aspect of the present disclosure, the RID currently stored in the RID register 452 and the optional control bit 450 are protected against modification by untrusted software. In one scenario, for example, when the core device 444 executes an instruction for entering the realm 416 and the RID register 452 includes the RID corresponding to the realm 416, memory transactions (e.g., data read/write transaction or an instruction fetch transaction) between the core device 444 and the memory device 404 may be tagged to include the RID in the RID register 452 and the optional control bit 450. The control bit 450 may allow or prevent a memory transaction for reading data from or writing data to a region of the memory device 404 that is outside of the realm 416 (also referred to as a non-realm region of the memory device 404). For example, the core device 444 may configure the control bit 450 to allow or prevent limited access to non-realm regions of the memory device 404. In one aspect, such limited access may enable the reading or writing of data, but not fetching instructions, from the non-realm regions of the memory device 404. The control bit 450 is also herein referred to as a "data outside realm allowed" (DORA) bit 450. In an aspect of the present disclosure, the DORA bit 450 may not be visible to any software. For example, the core device 444 may allow a memory transaction for reading from a non-realm region of the memory device 404 by temporarily enabling the DORA bit 450 (e.g., setting the DORA bit 450 to '1'). In another example, the core device 444 may prevent a memory transaction for reading from a non-realm region of the memory device 404 by temporarily disabling the DORA bit 450 (e.g., setting the DORA bit 450 to '0'). In one aspect of the present disclosure, when the DORA bit 450 is enabled (e.g., set to '1') to allow a memory transaction for reading data from or writing data to a non-realm region (also referred to as a non-realm page) of the memory device 404, reading of instructions from a non-realm region of the memory device 404 may not be permitted. In order to initiate a memory transaction, the core device 444 may include the RID in the RID register 452, the type of memory transaction (e.g., data or instructions), and the optional DORA bit 450 in a memory command (e.g., for initiating a data read/write transaction or an instruction fetch transaction) and may transmit the memory command to the MMU 442.

Memory Management Unit (MMU) Operations for Realm Execution

The MMU 442 may maintain a memory page table (e.g., mapping between virtual addresses and physical addresses) and may include a realm indicator bit (RB) 454 in memory pages belonging to a realm. For example, each memory page corresponding to a realm in the memory device 404 may be marked as a "realm page" using the RB 454. Therefore, the RB 454 may allow the MMU 442 to identify whether a memory page belongs to the realm 416. For example, the RB 454 may be configured in any MMU translation stage (e.g., when more than one translation stage is implemented) and any memory page for which the RB 454 is enabled (e.g., the RB 454 is set to '1') may be considered to be a memory page belonging to the realm 416.

In an aspect of the present disclosure, the MMU 442 may receive a memory transaction (e.g., a memory command for initiating a data read/write transaction or an instruction fetch transaction) from the core device 444. The memory transaction may include a memory transaction address (e.g., a memory address from which data or an instruction is to be read, or to which data is to be written) that is associated with the memory device 404. The MMU 442 may determine a memory page corresponding to the memory transaction address and may determine the value (e.g., '0' or '1') of the RB 454 for the memory page. The MMU 442 may include the value of the RB 454 in the memory transaction received from the core device 444 and may forward the memory transaction including the RID 452 (e.g., the value currently stored in the RID register 452), the optional DORA bit 450, and the value of the RB 454 to the memory encryption module 412 via the path 448. In one aspect, the MMU 442 may receive and/or transmit the RID during a memory transaction without translating or modifying the RID.

In an aspect, when the RB 454 for a memory page is not enabled (e.g., the RB 454 is set to '0'), the MMU 442 may check whether the RID included in the memory transaction indicates a realm. For example, the MMU 442 may determine that the RID included in the memory transaction indicates a realm when the RID is not zero or a predetermined special value. In this aspect, if the RB 454 for a memory page is not enabled and the RID included in the memory transaction indicates a realm, the MMU 442 may fault or force the core device 444 out of the realm 416 (e.g., force the core device 444 to quit the realm 416). In one aspect of the present disclosure, the realm 416 may be extended by setting the RB 454 for one or more additional memory pages. In an aspect, if the RB 454 is manipulated (e.g., if the value of the RB 454 is changed for a memory page by an untrusted entity or software), any data and/or instructions read from the realm 416 will be in a form (e.g., in an encrypted form) that prevents processing by the core device 444.

Software Protection Device Operations for Realm Execution

Figure 5A:
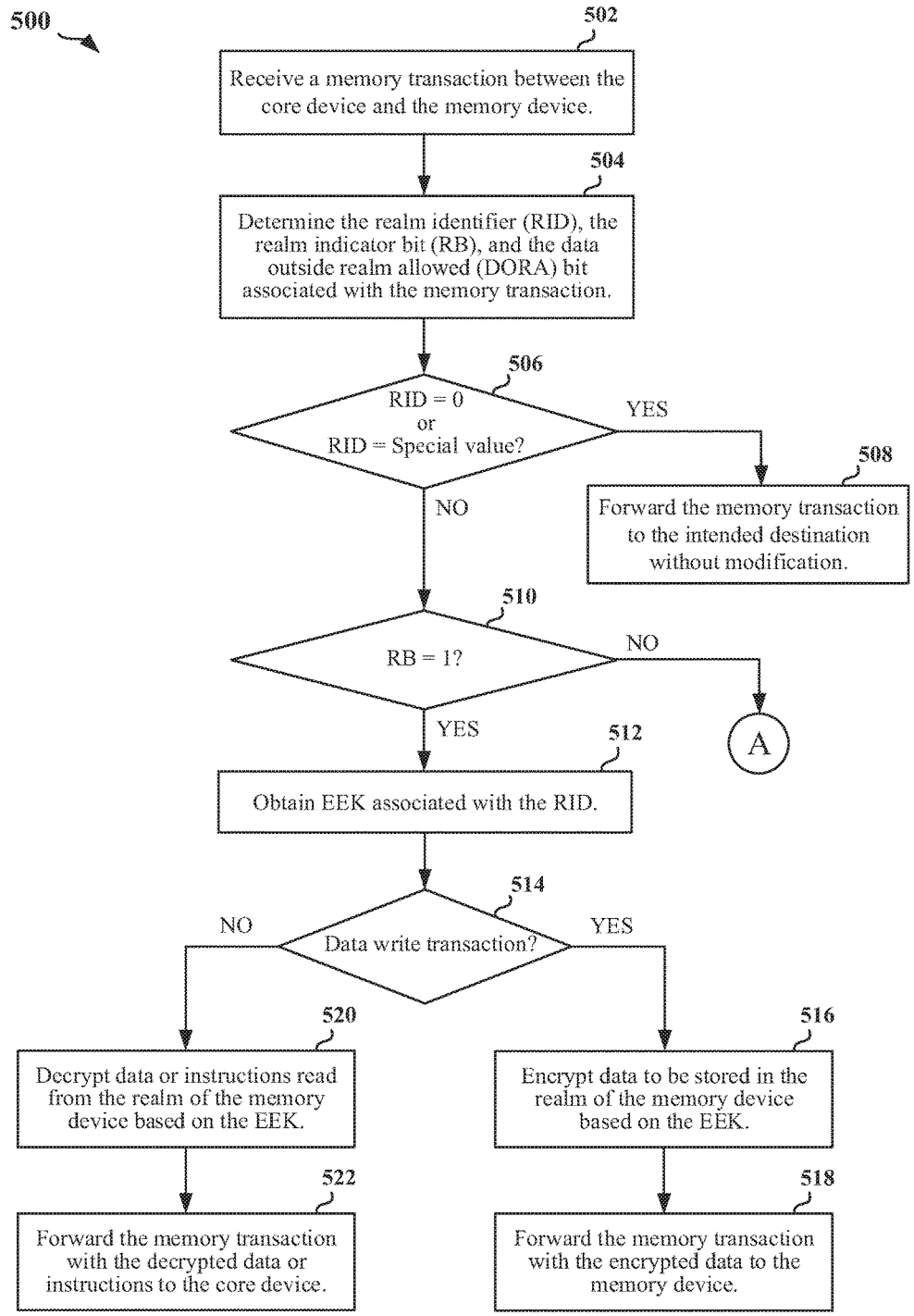
FIG. 5 (including FIGS. 5A and 5B) illustrates a method for a software protection device in accordance with various aspects of the present disclosure.
Figure 5B:
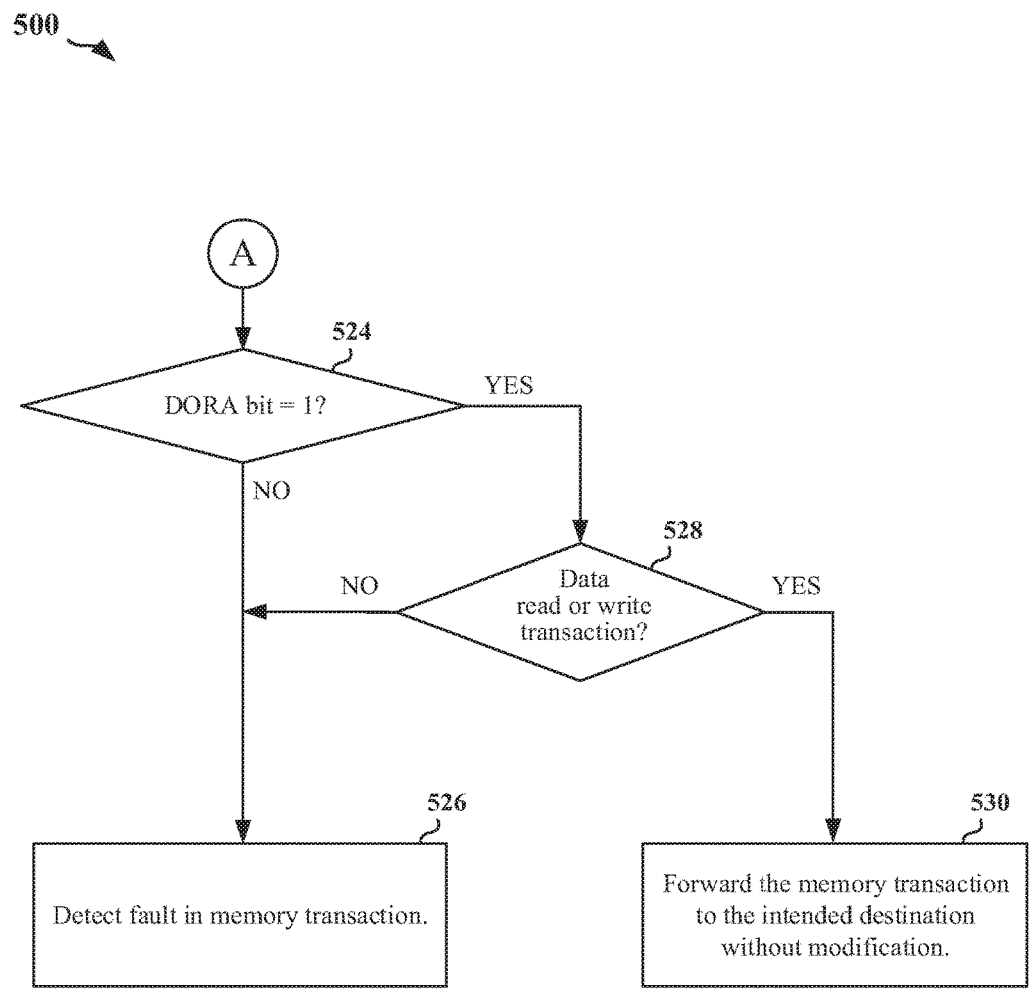

The operations of the software protection device 402 will now be discussed with reference to FIG. 4 and the method illustrated in FIG. 5 (including FIGS. 5A and 5B). In one aspect, the operations described with reference to FIG. 5 may be performed by the memory encryption module 412 (also referred to as a memory encryption engine) of the software protection device 402. As shown in FIG. 5A, the software protection device 402 may receive 502 a memory transaction between the core device 444 and the memory device 404. In an aspect of the present disclosure, the software protection device 402 may determine whether the memory transaction is associated with a data read transaction, a data write transaction, or an instruction fetch transaction. The software protection device 402 may determine 504 the RID 452 (e.g., the value currently stored in the RID register 452), the realm indicator bit (RB) 454, and the optional DORA bit 450 associated with the memory transaction. In one example, and as previously discussed, each memory transaction may be tagged to include an RID, an RB, and an optional DORA bit.

The software protection device 402 may determine 506 whether the RID 452 in the memory transaction is zero or a special value that does not indicate a realm. If the RID 452 is zero or the special value, the software protection device 402 may forward 508 the memory transaction to the appropriate entity without modification. In one example, if the memory transaction is a request from the core device 444 to read data from the memory device 404, the software protection device 402 may forward the request to the memory device 404 without modification. In another example, if the memory transaction is data (e.g., payload) being returned to the core device 444 from the memory device 404 in response to a request to read data, the software protection device 402 may forward the returned data to the core device 444 without modification (e.g., without decrypting the returned data). In yet another example, if the memory transaction is a request from the core device 444 to write data to the memory device 404, the software protection device 402 may forward the data to be written to the memory device 404 without modification (e.g., without encrypting the data to be written to the memory device 404).

If the software protection device 402 determines 506 that the RID 452 in the memory transaction is not zero or the special value, the software protection device 402 may determine 510 whether the RB 454 is enabled (e.g., whether the RB 454 is set to '1'). If the RB 454 is enabled, the software protection device 402 may obtain the EEK corresponding to the RID 452. In one aspect, the EEK corresponding to the RID 452 may be obtained from the key store 410 by matching the RID 452 of the memory transaction to the RID of the RID/EEK pair 414 stored in the key store 410. The EEK of the RID/EEK pair 414 may then be transmitted to the memory encryption module 412 via the exclusive interface 426. The software protection device 402 may then determine 514 whether the memory transaction is for writing data to the memory device 404 or for reading data/instructions from the memory device 404. If the memory transaction is for writing data to the memory device 404, the software protection device 402 may encrypt 516 the data of the memory transaction that is to be stored in the memory device 404 (e.g., in the realm 416 of the memory device 404) based on the EEK and may forward 518 the memory transaction including the encrypted data to the memory device 404. If the memory transaction is not for writing data to the memory device 404 (e.g., the memory transaction is for reading data or fetching instructions from the memory device 404), the software protection device 402 may decrypt 520 the data and/or instructions (e.g., payload) returned from the realm 416 of the memory device 404 based on the EEK and may forward 522 the memory transaction with the decrypted data or instructions to the core device 444.

If the software protection device 402 determines 510 that the RB 454 is not enabled, the software protection device 402 may proceed to determine 512 whether the optional DORA bit 450 is enabled (e.g., whether the optional DORA bit 450 is set to '1'). The software protection device 402 may detect 526 a fault in the memory transaction when the optional DORA bit 450 is not enabled. However, if the optional DORA bit is enabled, the software protection device 402 may determine 528 whether the transaction is for reading data or for writing data. If the memory transaction involves reading data from the memory device 404 or for writing data to the memory device 404, the software protection device 402 may forward 530 the memory transaction to the intended destination without modification. For example, if the memory transaction is data (e.g., payload) being returned to the core device 444 from the memory device 404 in response to a request to read data, the software protection device 402 may forward the returned data to the core device 444 without modification (e.g., without decrypting the returned data). In another example, if the memory transaction is a request from the core device 444 to write data to the memory device 404, the software protection device 402 may forward the data to be written to the memory device 404 without modification (e.g., without encrypting the data to be written to the memory device 404). If the memory transaction does not involve reading data from the memory device 404 or for writing data to the memory device 404 (e.g., the memory transaction involves fetching instructions from the memory device 404), the software protection device 402 may detect 526 a fault in the memory transaction.

In one aspect of the present disclosure, when the core device 444 has entered the realm 416, a memory transaction for fetching an instruction from a non-realm page of the memory device 404 may erase the RID stored in the RID register 452. In such aspect, the core device 444 may be said to quit (e.g., exit) the realm 416.

It can be appreciated that the aspects described herein may be implemented without impacting the operation of other core devices (in addition to core device 444) of the CPU 440. In an aspect, the software protection device 402 may function automatically with off-chip memory. Realm memory pages may be swapped in and out of the memory device 404 in some aspects. Threaded execution may be possible in some aspects. In an aspect, any of the previously described commands, functions, and/or instructions supported by the core device 444 may be implemented as microcode or trusted firmware. In an aspect, the core device 444 may support overriding of exception vectors.

Therefore, since the instructions and/or other assets in the realm 416 are encrypted (e.g., encrypted with the EEK of the RID/EEK pair 414), such instructions and/or other assets may not be transparent to any entity (e.g., core device 444, MMU 442, and/or other realms that may be implemented in the memory device 404) external to the realm 416. In an aspect, an external entity may be allowed to meaningfully access the protected contents of the realm 416 by transferring control of the realm 416 to the external entity. In an aspect, control of the realm 416 may be transferred to an external entity by allowing the external entity to "jump" into the realm 416. For example, such external entity may jump into the realm 416 by performing an atomic operation (e.g., an operation during which the external entity simultaneously reads a location and writes it in the same bus operation) to jump into the realm 416 and set the encryption key (e.g., the EEK associated with the RID 452) associated with the realm 416. Such atomic operation may prevent setting an RID value (e.g., in the RID register 452) without jumping into the realm corresponding to the RID value. The uniqueness of the encryption key for a particular realm may guarantee that the contents of the particular realm are opaque (e.g., not transparent) with respect to other realms and/or other entities. In an aspect, the architecture 400 allows execution of instructions (e.g., instructions of the target software 318) that control the core device 444. In an aspect, data in a realm (e.g., the realm 416) may be accessed by an entity if the entity has already jumped into the realm.

Execution of Multiple Realms in a Memory Device

Figure 6:
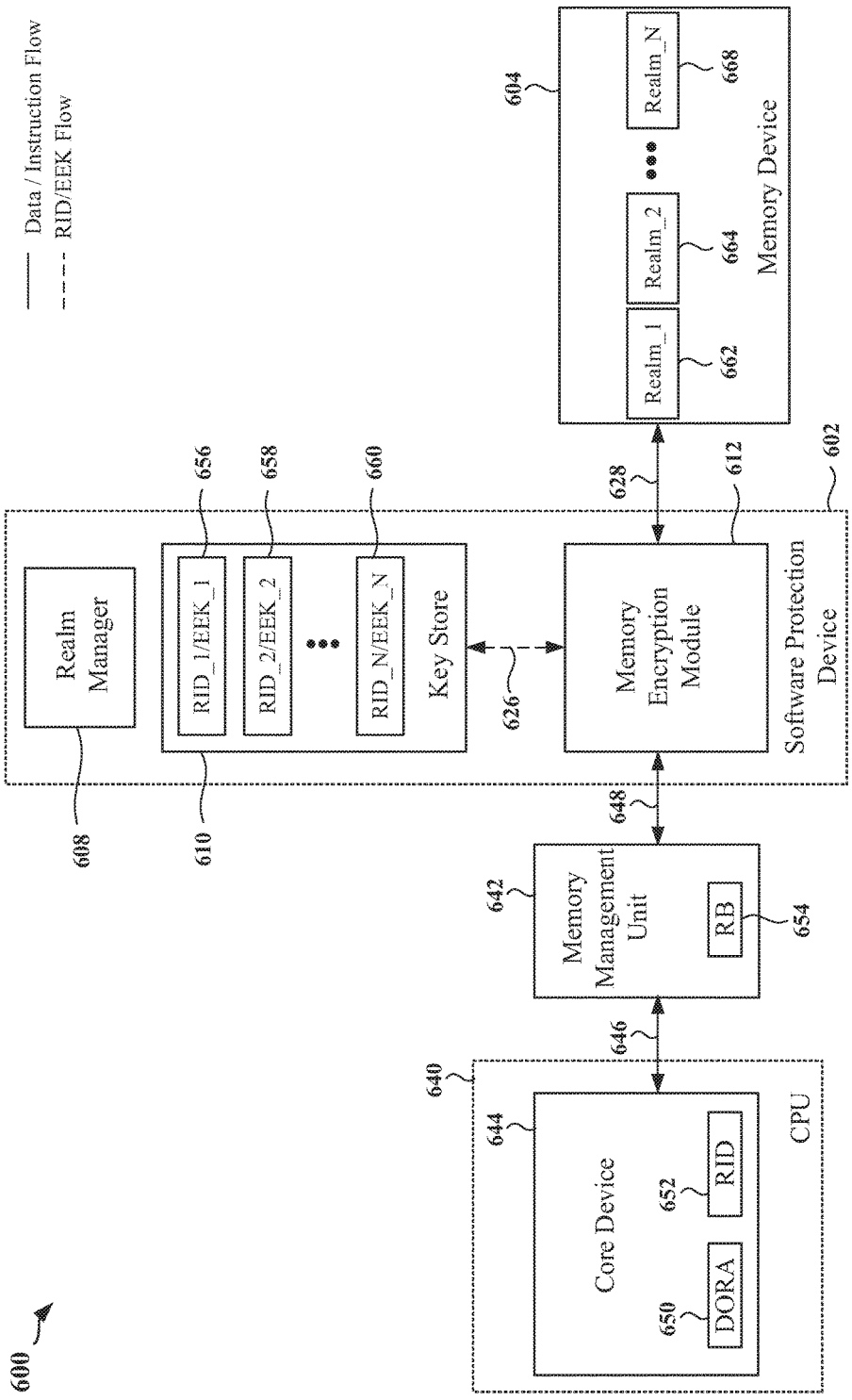
FIG. 6 is a block diagram of an example architecture in accordance with various aspects of the present disclosure.

FIG. 6 is a block diagram of an example architecture 600 in accordance with various aspects of the present disclosure. For example, the architecture 600 may be implemented in a computing device, such as a personal computer, cell phone (also referred to as a UE), or a handheld gaming device. As shown in FIG. 6, the architecture 600 includes a software protection device 602, a memory device 604, a central processing unit (CPU) 640, and a memory management unit (MMU) 642. As further shown in FIG. 6, the CPU 640 may include a core device 644, and the software protection device 602 may include a realm manager 608, a key store 610, and a memory encryption module 612. In other aspects, the MMU 642 may be included in the CPU 640. In an aspect of the present disclosure, the software protection device 602, the memory device 604, the realm manager 608, the key store 610, and the memory encryption module 612 in FIG. 6 may respectively correspond to the software protection device 402, the memory device 404, the realm manager 408, the key store 410, and the memory encryption module 412 in FIG. 4. Moreover, the paths 646, 648, and 628 may respectively correspond to the paths 446, 448, and 428 in FIG. 4.

As shown in the example configuration of FIG. 6, multiple coexisting realms, such as the realm_1 662, realm_2 664, and realm_N 668, may be established in the memory device 604. In an aspect of the present disclosure, the realm_1 662, realm_2 664, and realm_N 668 may be established by the realm manager 608 in a manner similar to the establishment of the realm 316 previously discussed with respect to FIG. 3. For example, each realm in the memory device 604 may be used to protect different target software, where each target software includes instructions and/or data. For example, the realm_1 662 may be established to protect first target software, realm_2 664 may be established to protect second target software, and realm_N 668 may be established to protect Nth target software. Accordingly, the realm_1 662 may be associated with a first realm identifier (e.g., RID_1) and a first ephemeral encryption key (EEK_1), the realm_2 664 may be associated with a second realm identifier (e.g., RID_2) and a second ephemeral encryption key (EEK_2), and the realm_N 668 may be associated with an Nth realm identifier (e.g., RID_N) and an Nth ephemeral encryption key (EEK_N). In an aspect of the present disclosure, the EEK_1, EEK_2, and the EEK_N may be different from one another. As shown in FIG. 6, the RIDs and corresponding EEKs are stored in the key store 610 as RID_I/EEK_1 pair 656, RID_2/EEK_2 pair 658, and RID_N/EEK_N pair 660. Therefore, in one example, the first target software (e.g., the data and/or instructions of the first target software) stored in the realm_1 662 is encrypted with the EEK_1, the second target software (e.g., the data and/or instructions of the second target software) in the realm_2 664 is encrypted with the EEK_2, and the Nth target software (e.g., the data and/or instructions of the Nth target software) in the realm_N 668 is encrypted with the EEK_N. In one example, the core device 644 may be configured to execute the first, second, and Nth target software concurrently. It should be noted that since each of the realms (e.g., realm_1 662, realm_2 664, and realm_N 668) in the memory device 604 contains different target software that has been encrypted with a unique encryption key, the realms in the memory device 604 may not be able to interact (e.g., communicate) with each other, thereby protecting each target software from attack or manipulation from other target software residing in the memory device 604.

In an aspect of the present disclosure, the software protection device 602 may receive a memory transaction between the core device 644 and the memory device 604. The software protection device 602 may then determine an RID, an RB, and an optional DORA bit in the memory transaction. If the RID in the memory transaction is not zero or a special value, the software protection device 602 may determine whether the RB (e.g., RB 654) is enabled (e.g., whether the RB is set to '1'). If the RB is enabled, the software protection device 602 may obtain the EEK corresponding to the RID. In one aspect, the EEK corresponding to the RID may be obtained from the key store 610 by matching the RID of the memory transaction to an RID stored in the key store 610.

For example, if the RID in the memory transaction is "RID_2" (e.g., the RID of the realm_2 664), the software protection device 602 may match the RID_2 of the memory transaction to the RID_2/EEK_2 pair 658. The EEK_2 of the RID_2/EEK_2 pair 658 may then be transmitted to the memory encryption module 612 via the exclusive interface 626. The software protection device 602 may then determine whether the memory transaction is for writing data to the memory device 604 or for reading data/instructions from the memory device 604. If the memory transaction is for writing data to the memory device 604, the software protection device 602 may encrypt the data of the memory transaction that is to be stored in the memory device 604 (e.g., in the realm_2 664 of the memory device 604) based on the EEK_2 and may forward the memory transaction including the encrypted data to the memory device 604. If the memory transaction is not for writing data to the memory device 604 (e.g., the memory transaction is for reading data or fetching instructions from the memory device 604), the software protection device 602 may decrypt the data and/or instructions (e.g., payload) returned from the realm_2 664 of the memory device 604 based on the EEK_2 and may forward the memory transaction with the decrypted data or instructions to the core device 644.

Therefore, since each realm in a memory device (e.g. memory device 604) may be distinguished from other realms based on an RID and a corresponding unique encryption key (e.g., EEK), a realm that attempts to read the contents (e.g., instructions and/or data) from another realm will not have access to the correct encryption key. As such, any information read from a different realm may be meaningless. In an aspect, a realm may be configured to use different encryption keys for instructions and data accesses, or configured to use no encryption for data. It should be noted that if there is no encryption, there may be no additional data access latency.

Example Operations to Package Target Software for Storage in a Realm

In an aspect, a developer (e.g., a software or application developer) may generate code (e.g., the target software 318 in FIG. 3), which may include instructions and associated data to be executed by a core device or other processing device. The developer may then deliver the code and/or data in a secure manner to the realm manager 308. This may involve encrypting and authenticating the package using keys (e.g., permanent cryptographic keys) that are shared with the realm manager 308.

Example Configuration of Realms in a Memory Device

Figure 7:
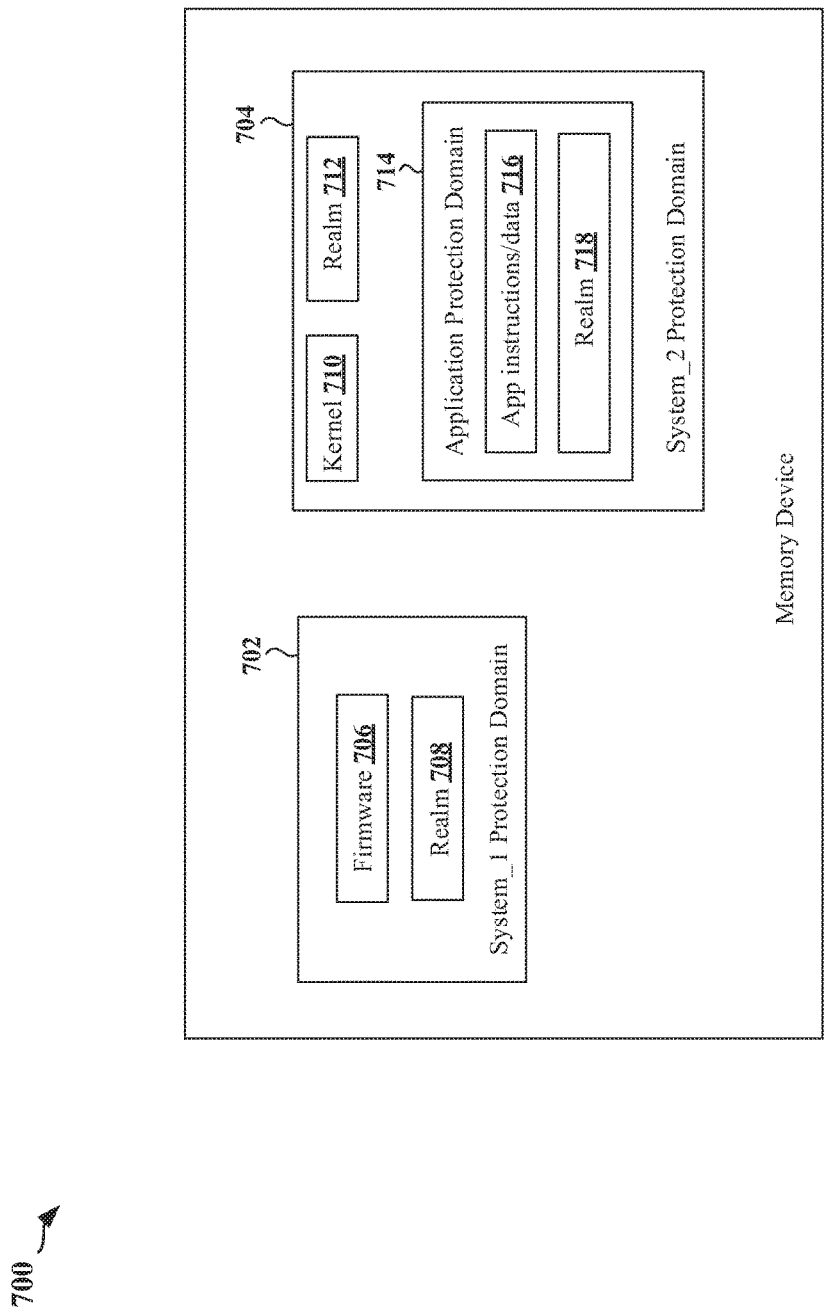
FIG. 7 is an example configuration of realms in a memory device in accordance with various aspects of the present disclosure.

FIG. 7 is an example configuration of realms in a memory device 700 in accordance with various aspects of the present disclosure. As shown in FIG. 7, the memory device 700 includes a protection domain (PD) 702 for a first system (e.g., system_1), and a PD 704 for a second system (e.g., system_2). It should be understood that in other aspects, the memory device 700 may be configured for a different number of systems and/or different types of systems. For example, system_1 may be associated with a modem device and system_2 may be associated with an operating system. In such example, the PD 702 may include firmware 706 for the modem device and may include a realm 708. In an aspect, the realm 708 may represent portions of the memory device 700 that include protected (e.g., encrypted) software and/or protected data for the modem. As shown in FIG. 7, the PD 704 may include a kernel 710, a realm 712 and an application PD 714. The application PD 714 may be associated with an application for the system_2 and may include application instructions/data 716 and may include a realm 718. In an aspect, the realm 718 represents portions of memory that include protected (e.g., encrypted) software and/or protected data.

Exemplary Electronic Device and Method Thereon

Figure 8:
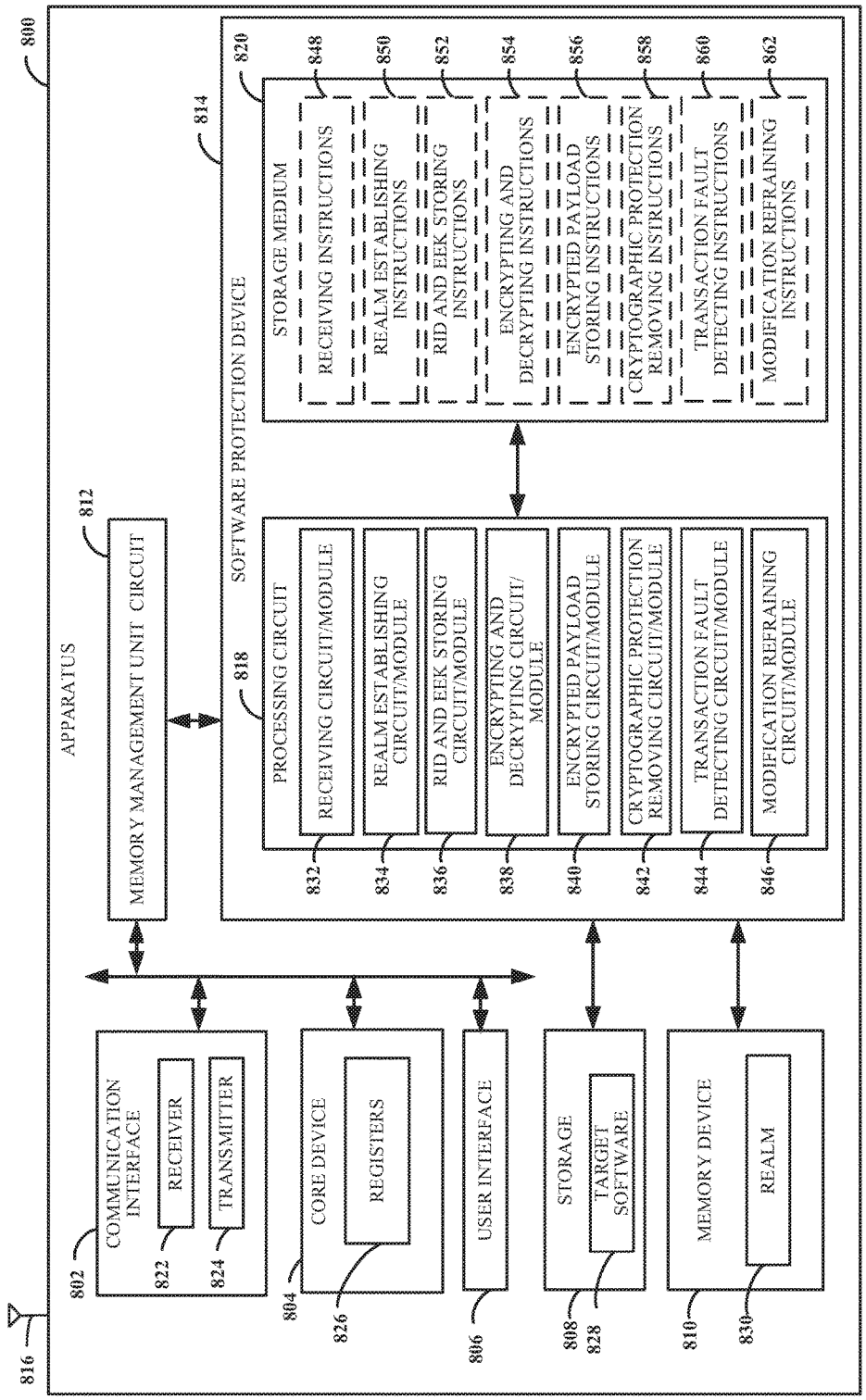
FIG. 8 is an illustration of an apparatus configured to support operations related to protecting software in a memory device according to one or more aspects of the present disclosure.

FIG. 8 is an illustration of an apparatus 800 configured to support operations related to protecting software in a memory device according to one or more aspects of the disclosure (e.g., aspects related to the methods of FIGS. 9 and 10 described below). The apparatus 800 includes a communication interface (e.g., at least one transceiver) 802, a core device 804, a user interface 806, a storage 808, a memory device 810, an MMU circuit 812, and a software protection device 814.

These components can be coupled to and/or placed in electrical communication with one another via a signaling bus or other suitable component, represented generally by the connection lines in FIG. 8. The signaling bus may include any number of interconnecting buses and bridges depending on the specific application of the core device 804 and the overall design constraints. The signaling bus links together the communication interface 802, the core device 804, the user interface 806, and the MMU circuit 812. The signaling bus may also link various other circuits (not shown) such as timing sources, peripherals, voltage regulators, and power management circuits, which are well known in the art, and therefore, will not be described any further.

The communication interface 802 may be adapted to facilitate wireless communication of the apparatus 800. For example, the communication interface 802 may include circuitry and/or code (e.g., instructions) adapted to facilitate the communication of information bi-directionally with respect to one or more communication devices in a network. The communication interface 802 may be coupled to one or more antennas 816 for wireless communication within a wireless communication system. The communication interface 802 can be configured with one or more standalone receivers and/or transmitters, as well as one or more transceivers. In the illustrated example, the communication interface 802 includes a receiver 822 and a transmitter 824.

The core device 804 may include one or more registers 826, such as the RID register 452 or a register for setting an optional control bit (e.g., DORA bit 450), that is not write accessible to external entities. For example, the core device 804 may correspond to the core device 444 in FIG. 4 or the core device 644 in FIG. 6.

The memory device 810 may represent one or more memory devices. For example, the memory device 810 may correspond to the memory device 304 in FIG. 3 or the memory device 404 in FIG. 4. The memory device 810 may serve as a main memory for the core device 804 of the apparatus 800. In some implementations, the memory device 810, the storage 808, and the storage medium 820 are implemented as a common memory component. The memory device 810 may also be used for storing data that is manipulated by the core device 804 or some other component of the apparatus 800.

The storage medium 820 may represent one or more computer-readable, machine-readable, and/or processor-readable devices for storing code, such as processor executable code or instructions (e.g., software, firmware), electronic data, databases, or other digital information. The storage medium 820 may also be used for storing data that is manipulated by the processing circuit 818 of the software protection device 814 when executing code. The storage medium 820 may be any available media that can be accessed by a general purpose or special purpose processor, including portable or fixed storage devices, optical storage devices, and various other mediums capable of storing, containing or carrying code.

By way of example and not limitation, the storage medium 820 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 820 may be embodied in an article of manufacture (e.g., a computer program product). By way of example, a computer program product may include a computer-readable medium in packaging materials. In view of the above, in some implementations, the storage medium 820 may be a non-transitory (e.g., tangible) storage medium. The storage medium 820 may be coupled to the processing circuit 818 of the software protection device 814, such that the processing circuit 818 can read information from, and write information to, the storage medium 820.

Code and/or instructions stored by the storage medium 820, when executed by the processing circuit 818 of the software protection device 814, causes the processing circuit 818 to perform one or more of the various functions and/or process operations described herein. For example, the storage medium 820 may include operations configured for regulating operations at one or more hardware blocks of the processing circuit 818.

The processing circuit 818 of the software protection device 814 is generally adapted for processing, including the execution of such code/instructions stored on the storage medium 820. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 818 of the software protection device 814 is arranged to obtain, process and/or send data, control data access and storage, issue commands, and control other desired operations. The processing circuit 818 may include circuitry configured to implement desired code provided by appropriate media in at least one example. For example, the processing circuit 818 may be implemented as one or more processors, one or more controllers, and/or other structure configured to execute executable code. Examples of the processing circuit 818 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 818 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 818 are for illustration and other suitable configurations within the scope of the disclosure are also contemplated.

According to one or more aspects of the disclosure, the processing circuit 818 may be adapted to perform any or all of the features, processes, functions, operations and/or routines for any or all of the apparatuses described herein. As used herein, the term "adapted" in relation to the processing circuit 818 may refer to the processing circuit 818 being one or more of configured, employed, implemented, and/or programmed to perform a particular process, function, operation and/or routine according to various features described herein.

Figure 9A:
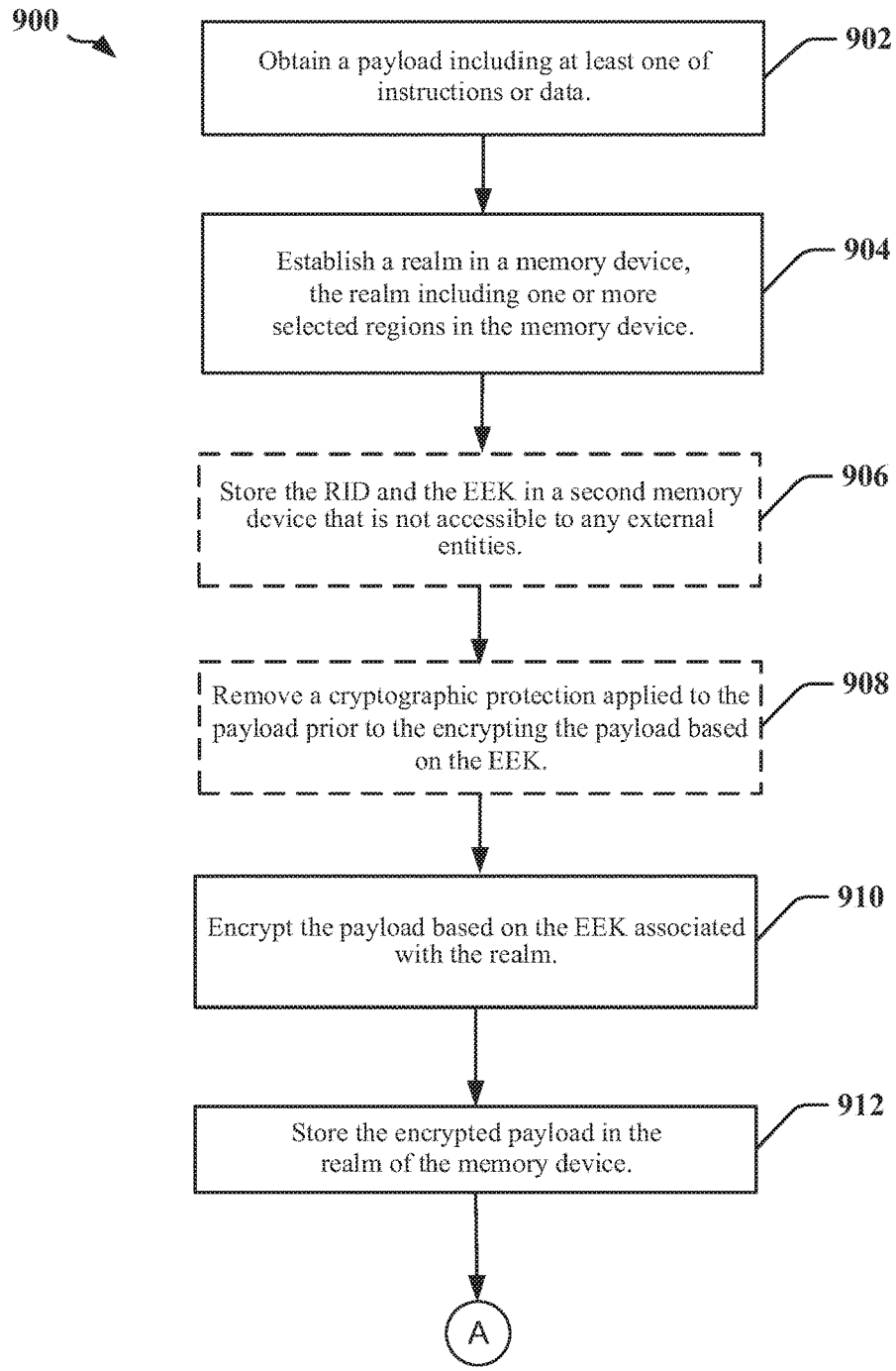
FIG. 9 (including FIGS. 9A and 9B) illustrates a method operational in an apparatus for protecting software in a memory device in accordance with various aspects of the present disclosure.
Figure 9B:
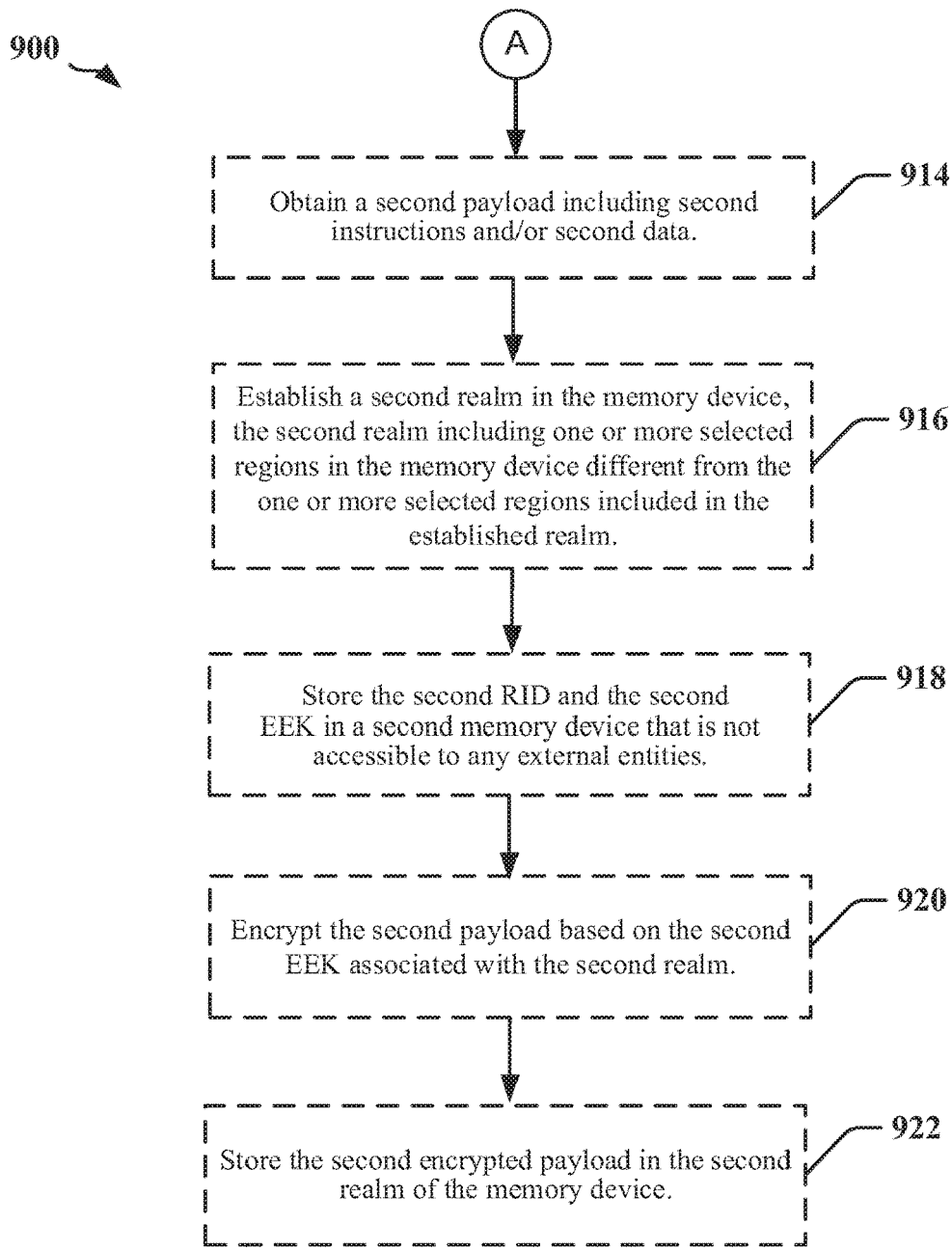
Figure 10:
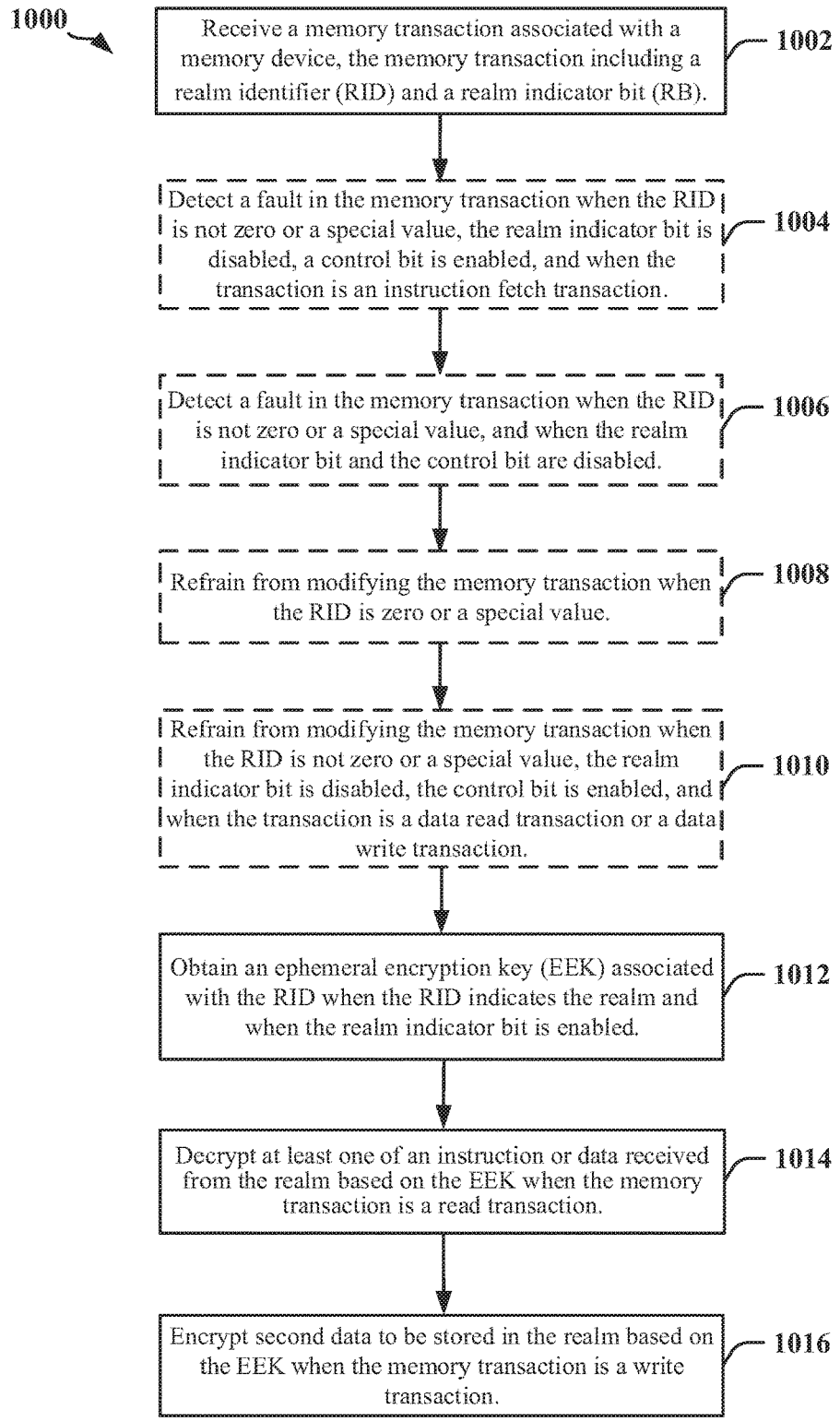
FIG. 10 illustrates a method operational in an apparatus for protecting software in a memory device in accordance with various aspects of the present disclosure.

According to at least one example of the apparatus 800, the processing circuit 818 may include one or more of a receiving circuit/module 832, a realm establishing circuit/module 834, an RID and EEK storing circuit/module 836, an encrypting and decrypting circuit/module 838, an encrypted payload storing circuit/module 840, a cryptographic protection removing circuit/module 842, a transaction fault detecting circuit/module 844, and a modification refraining circuit/module 846 that are adapted to perform any or all of the features, processes, functions, operations and/or routines described herein (e.g., features, processes, functions, operations and/or routines described with respect to FIGS. 9 and 10).

The receiving circuit/module 832 may include circuitry and/or instructions (e.g., receiving instructions 848 stored on the storage medium 820) adapted to perform several functions relating to, for example, receiving a payload including at least one of instructions or data, receiving a second payload including at least one of second instructions or second data, and/or receiving a memory transaction associated with the memory device, the memory transaction including at least a realm identifier (RID) and a realm indicator bit, where the RID enables identification of a realm that includes one or more selected regions in the memory device.

The realm establishing circuit/module 834 may include circuitry and/or instructions (e.g., realm establishing instructions 850 stored on the storage medium 820) adapted to perform several functions relating to, for example, obtaining a payload including at least one of instructions or data, establishing a realm in a memory device, the realm including one or more selected regions in the memory device, obtaining a second payload including at least one of second instructions or second data, and establishing a second realm in the memory device, where the second realm includes one or more selected regions in the memory device different from the one or more selected regions included in a previously established realm.

The RID and EEK storing circuit/module 836 may include circuitry and/or instructions (e.g., RID and EEK storing instructions 852 stored on the storage medium 820) adapted to perform several functions relating to, for example, storing the RID and the EEK in a second memory device that is not accessible to any external entities and/or storing the second RID and the second EEK in a second memory device that is not accessible to any external entities.

The encrypting and decrypting circuit/module 838 may include circuitry and/or instructions (e.g., encrypting and decrypting instructions 854 stored on the storage medium 820) adapted to perform several functions relating to, for example, obtaining an ephemeral encryption key (EEK) associated with the RID when the RID indicates the realm and when the realm indicator bit is enabled, encrypting the payload based on the EEK associated with the realm, encrypting the second payload based on a second EEK associated with the second realm, decrypting at least one of an instruction or data retrieved from the realm based on the EEK when the memory transaction is a read transaction, and/or encrypting second data to be stored in the realm based on the EEK when the memory transaction is a write transaction.

The encrypted payload storing circuit/module 840 may include circuitry and/or instructions (e.g., encrypted payload storing instructions 856 stored on the storage medium 820) adapted to perform several functions relating to, for example, storing the encrypted payload in the realm of the memory device and/or storing the second encrypted payload in the second realm of the memory device.

The cryptographic protection removing circuit/module 842 may include circuitry and/or instructions (e.g., cryptographic protection removing instructions 858 stored on the storage medium 820) adapted to perform several functions relating to, for example, removing a cryptographic protection applied to the payload prior to the encrypting the payload based on the EEK.

The transaction fault detecting circuit/module 844 may include circuitry and/or instructions (e.g., transaction fault detecting instructions 860 stored on the storage medium 820) adapted to perform several functions relating to, for example, detecting a fault in the memory transaction when the RID is not zero or a special value, the realm indicator bit is disabled, the control bit is enabled, and when the transaction is an instruction fetch transaction. As another example, transaction fault detecting circuit/module 844 may detect a fault in the memory transaction when the RID is not zero or a special value, and when the realm indicator bit and the control bit are disabled.

The modification refraining circuit/module 846 may include circuitry and/or instructions (e.g., modification refraining instructions 862 stored on the storage medium 820) adapted to perform several functions relating to, for example, refraining from modifying the memory transaction when the RID is zero or a special value and/or refraining from modifying the memory transaction when the RID is not zero or a special value, the realm indicator bit is disabled, the control bit is enabled, and when the transaction is a data read transaction or a data write transaction.

As mentioned above, instructions stored by the storage medium 820, when executed by the processing circuit 818 of the software protection device 814, causes the processing circuit 818 to perform one or more of the various functions and/or process operations described herein. For example, the storage medium 820 may include one or more of the receiving instructions 848, realm establishing instructions 850, RID and EEK storing instructions 852, encrypting and decrypting instructions 854, encrypted payload storing instructions 856, cryptographic protection removing instructions 858, transaction fault detecting instructions 860, and modification refraining instructions 862.

First Example Method

FIG. 9 (including FIGS. 9A and 9B) illustrates a method operational in an apparatus for protecting software in a memory device (e.g., the memory device 304 or the memory device 810) in accordance with various aspects of the present disclosure. In one aspect of the present disclosure, the apparatus may be a software protection device (e.g., software protection device 302 or the software protection device 814). It should be understood that the operations indicated by dotted lines in FIG. 9 are optional.

The apparatus may obtain a payload including at least one of instructions or data 902. In one aspect of the present disclosure, the payload may be obtained in a secure communication or obtained from a secure storage. The apparatus may establish a realm in a memory device, the realm including one or more selected regions in the memory device 904. In one aspect, the apparatus may establish the realm by generating a realm identifier (RID) and the EEK for the realm, where the RID is associated with the EEK. The apparatus may store the RID and the EEK in a second memory device that is not accessible to any external entities 906. The apparatus may remove a cryptographic protection applied to the payload prior to the encrypting the payload based on the EEK 908. In one aspect of the present disclosure, the apparatus may remove the cryptographic protection by verifying the payload and/or decrypting the payload using a permanent cryptographic key. The apparatus may encrypt the payload based on an ephemeral encryption key (EEK) associated with the realm 910. The apparatus may store the encrypted payload in the realm of the memory device 912.

The apparatus may obtain a second payload including at least one of second instructions or second data 914. The apparatus may establish a second realm in the memory device, the second realm including one or more selected regions in the memory device different from the one or more selected regions included in the established realm 916. In one aspect of the present disclosure, the apparatus may establish the second realm by generating a second realm identifier (RID) and the second EEK for the second realm in the memory device, where the second RID is associated with the second EEK. The apparatus may store the second RID and the second EEK in a second memory device that is not accessible to any external entities 918. The apparatus may encrypt the second payload based on a second ephemeral encryption key (EEK) associated with the second realm 920. The apparatus may store the second encrypted payload in the second realm of the memory device 922.

Second Example Method

FIG. 10 illustrates a method operational in an apparatus for protecting software in a memory device (e.g., the memory device 404 or the memory device 810) in accordance with various aspects of the present disclosure. In one aspect of the present disclosure, the apparatus may be a software protection device (e.g., software protection device 402 or the software protection device 814). It should be understood that the operations indicated by dotted lines in FIG. 10 are optional.

The apparatus may receive a memory transaction associated with the memory device, the memory transaction including at least a realm identifier (RID) and a realm indicator bit, where the RID enables identification of a realm that includes one or more selected regions in the memory device 1002. In one aspect of the present disclosure, the memory transaction may further include an optional control bit (e.g., the DORA bit 450) that controls access to regions of the memory device outside of the realm. The apparatus may detect a fault in the memory transaction when the RID is not zero or a special value, the realm indicator bit is disabled, the control bit is enabled, and when the transaction is an instruction fetch transaction 1004. The apparatus may detect a fault in the memory transaction when the RID is not zero or a special value, and when the realm indicator bit and the control bit are disabled 1006. The apparatus may refrain from modifying the memory transaction when the RID is zero or a special value 1008. For example, the apparatus may forward the memory transaction to the intended destination without modification. The apparatus may refrain from modifying the memory transaction when the RID is not zero or a special value, the realm indicator bit is disabled, the control bit is enabled, and when the transaction is a data read transaction or a data write transaction 1010. The apparatus may obtain an ephemeral encryption key (EEK) associated with the RID when the RID indicates the realm and when the realm indicator bit is enabled 1012. In one aspect of the present disclosure, The RID and the EEK are stored in a second memory device that is not accessible to any external entities. The apparatus may decrypt at least one of an instruction or data retrieved from the realm based on the EEK when the memory transaction is a read transaction 1014. The apparatus may encrypt second data to be stored in the realm based on the EEK when the memory transaction is a write transaction 1016.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method for protecting software in a memory device, comprising: receiving a memory transaction associated with the memory device, the memory transaction including at least a realm identifier and a realm indicator bit, wherein the realm identifier enables identification of a realm that includes one or more selected regions in the memory device; obtaining an ephemeral encryption key associated with the realm identifier when the realm identifier indicates the realm and when the realm indicator bit is enabled, wherein the ephemeral encryption key is stored in a second memory device that is not accessible to a core device, and wherein the ephemeral encryption key is unknown to the core device; decrypting at least one of an instruction or data received from the realm based on the ephemeral encryption key when the memory transaction is a read transaction, wherein the at least one of the instruction or the data is to be processed by the core device; and encrypting second data to be stored in the realm based on the ephemeral encryption key when the memory transaction is a write transaction.

2. The method of claim 1, wherein the realm identifier is stored in the second memory device.

3. The method of claim 1, further comprising: refraining from modifying the memory transaction when the realm identifier is zero or a special value.

4. The apparatus of claim 1, wherein the ephemeral encryption key is a temporary or transitory encryption key that exists while the realm is maintained in the memory device.

5. The method of claim 1, wherein the memory transaction further includes a control bit that controls access to regions of the memory device outside of the realm, the method further comprising: refraining from modifying the memory transaction when the realm identifier is not zero or a special value, the realm indicator bit is disabled, the control bit is enabled, and when the transaction is a data read transaction or a data write transaction.

6. The method of claim 5, further comprising: detecting a fault in the memory transaction when the realm identifier is not zero or a special value, the realm indicator bit is disabled, the control bit is enabled, and when the transaction is an instruction fetch transaction.

7. The method of claim 5, further comprising: detecting a fault in the memory transaction when the realm identifier is not zero or a special value, and when the realm indicator bit and the control bit are disabled.

8. An apparatus, comprising; a memory device; and a processing circuit coupled to the memory device, the processing circuit configured to: receive a memory transaction associated with the memory device, the memory transaction including at least a realm identifier and a realm indicator bit, wherein the realm identifier enables identification of a realm that includes one or more selected regions in the memory device; obtain an ephemeral encryption key associated with the realm identifier when the realm identifier indicates the realm and when the realm indicator bit is enabled, wherein the ephemeral encryption key is stored in a second memory device that is not accessible to a core device, and wherein the ephemeral encryption key is unknown to the core device; decrypt at least one of an instruction or data received from the realm based on the ephemeral encryption key when the memory transaction is a read transaction, wherein the at least one of the instruction or the data is to be processed by the core device; and encrypt second data to be stored in the realm based on the ephemeral encryption key when the memory transaction is a write transaction.

9. The apparatus of claim 8, wherein the realm identifier is stored in the second memory device.

10. The apparatus of claim 8, wherein the processing circuit is further configured to: refrain from modifying the memory transaction when the realm identifier is zero or a special value.

11. The apparatus of claim 8, wherein the ephemeral encryption key is a temporary or transitory encryption key that exists while the realm is maintained in the memory device.

12. The apparatus of claim 8, wherein the memory transaction further includes a control bit that controls access to regions of the memory device outside of the realm, wherein the processing circuit is further configured to: refrain from modifying the memory transaction when the realm identifier is not zero or a special value, the realm indicator bit is disabled, the control bit is enabled, and when the transaction is a data read transaction or a data write transaction.

13. The apparatus of claim 12, wherein the processing circuit is further configured to: detect a fault in the memory transaction when the realm identifier is not zero or a special value, the realm indicator bit is disabled, the control bit is enabled, and when the transaction is an instruction fetch transaction.

14. The apparatus of claim 12, wherein the processing circuit is further configured to: detect a fault in the memory transaction when the realm identifier is not zero or a special value, and when the realm indicator bit and the control bit are disabled.

15. An apparatus, comprising: means for receiving a memory transaction associated with the memory device, the memory transaction including at least a realm identifier and a realm indicator bit, wherein the realm identifier enables identification of a realm that includes one or more selected regions in the memory device; means for obtaining an ephemeral encryption key associated with the realm identifier when the realm identifier indicates the realm and when the realm indicator bit is enabled, wherein the ephemeral encryption key is stored in a second memory device that is not accessible to a core device, and wherein the ephemeral encryption key is unknown to the core device; means for decrypting at least one of an instruction or data received from the realm based on the ephemeral encryption key when the memory transaction is a read transaction, wherein the at least one of the instruction or the data is to be processed by the core device; and means for encrypting second data to be stored in the realm based on the ephemeral encryption key when the memory transaction is a write transaction.

16. A non-transitory processor-readable storage medium having instructions stored thereon, which when executed by one or more processors causes the one or more processors to; receive a memory transaction associated with the memory device, the memory transaction including at least a realm identifier and a realm indicator bit, wherein the realm identifier enables identification of a realm that includes one or more selected regions in the memory device; obtain an ephemeral encryption key associated with the realm identifier when the realm identifier indicates the realm and when the realm indicator bit is enabled, wherein the ephemeral encryption key is stored in a second memory device that is not accessible to a core device, and wherein the ephemeral encryption key is unknown to the core device; decrypt at least one of an instruction or data received from the realm based on the ephemeral encryption key when the memory transaction is a read transaction, wherein the at least one of the instruction or the data is to be processed by the core device; and encrypt second data to be stored in the realm based on the ephemeral encryption key when the memory transaction is a write transaction.

* * * * *